United States Patent [19]

Ahrens

[11] 4,360,294

[45] Nov. 23, 1982

[54] SILAGE EXTRACTION APPARATUS

[75] Inventor: Ernst-W. Ahrens, Melle, Fed. Rep. of Germany

[73] Assignee: Engelbrecht + Lemmerbrock GmbH + Co., Melle, Fed. Rep. of Germany

[21] Appl. No.: 186,754

[22] Filed: Sep. 12, 1980

[30] Foreign Application Priority Data

Sep. 21, 1979 [DE] Fed. Rep. of Germany ....... 2938280

[51] Int. Cl.³ ...................... B65G 53/40; B65G 65/38
[52] U.S. Cl. .................................... 406/52; 406/114; 406/151; 414/314
[58] Field of Search ............... 414/313, 314, 325, 322; 406/52, 70, 71, 114, 151, 152

[56] References Cited

U.S. PATENT DOCUMENTS 3,246,776  4/1966  Spencer et al. .................. 414/314
3,363,785  1/1968  Kucera ........................... 414/314 X
3,462,199  8/1969  Harris et al. .................... 406/114 X

FOREIGN PATENT DOCUMENTS 7507956  1/1977  Netherlands ..................... 406/114

Primary Examiner—Jeffery V. Nase
Attorney, Agent, or Firm—Balogh, Osann, Kramer, Dvorak, Genova & Traub

[57] ABSTRACT

This invention relates to an apparatus for extracting silage for a cylindrical silo, of the kind including a suction extractor pipe and a suction aperture means including toothed wheels for feeding silage material to the suction aperture, the wheels directly carrying the extractor device. According to the invention, these toothed wheels are freely rotatably journalled on a plurality of supporting radial arms, and a cutting wheel is positioned obliquely with respect to a plane extending above and parallel to the silage surface. The peripheral part of the wheels next adjacent a vertical wall of the silo is spaced from the silo wall by a small amount and is freely rotatably journalled at the extremity of each of the radial arms.

3 Claims, 4 Drawing Figures

SILAGE EXTRACTION APPARATUS

BACKGROUND OF THE INVENTION

The present invention relates to an apparatus, for extracting silage from a cylindrical silo, of the kind including a suction extractor pipe having a suction aperture, and toothed wheels for feeding silage material to the suction aperture, and directly carrying the extractor device. The toothed wheels are freely and rotatably journalled on a plurality of supporting radial arms. Hereinafter such apparatus will be referred to as "of the kind described".

Known apparatus of the kind described (e.g. now described in German Offenlegungschrift No. 2532788, operable in such manner that the extractor device as a whole, comprising a driving system, lower and inner central frame element with cutting wheels or toothed drag wheels journalled on radial arms, is carried on the silage material in the cylindrical silo and is placed in slow rotation, the cutting wheels removing silage from the surface and by virtue of their agle of incidence feeding the same to the suction aperture of a central pneumatic and telescopic conveying pipe through which the silage is fed to a cowshed.

SInce the usual tall cylindrical silos for silage are erected in the open air, the case may arise in icy weather that the silage freezes, this freezing action occurring annularly inwards from the outside, i.e. first at the inner circumference of the silo. If the extractor device is in daily use, this frozen or frozen-on surface silage may be cut off by the conventional cutting wheels on the slowly revolving radial arms and fed to the suction aperture of the pneumatic suction extractor pipe. For reasons of safety, for prevention of damage to the generally enamelled inner casing surface of the silo, the periphery of the outermost cutting wheels situated at the extremities of the radial arms should always be set at a distance from the silo wall, so that a frozen residual layer then remains suspended on the inner silo surface in freezing weather. A layer of this kind may also adhere thereto if the silage happens to be very tacky. Until now, this layer had to be removed manually at frequent intervals, which was extremely onerous and time-consuming.

Consequently, it is an object of the invention to provide means for automatically breaking off and removing a tacky or frozen silage layer sticking to the inner surface of the silo during operation of the silage extracting apparatus.

SUMMARY OF THE INVENTION

Accordingly, the invention contemplates an apparatus for extracting silage from a cylindrical silo, which includes a suction extractor pipe having a suction aperture, conveying toothed wheels for feeding silage material to the suction aperture the wheels directly carrying the extractor device, and being freely rotatably journalled on a plurality of supporting radial arms, a cutting wheel positioned obliquely with respect to a plane extending above and parallel to the silage surface, and is freely rotatably journalled at the extremity of each of the radial arms. The cutting wheel (the peripheral part thereof next adjacent the vertical wall of the silo), is held at a small distance from the silo surface (or wall) above the horizontal plane passing through its bearing by means of a spacing wheel bearing against the silo wall, the cutting wheel and the supporting spacing wheel appropriately being impelled by a spring force against the silo wall.

During the rotation of the radial arms of the extractor device fitted with conveying cutting wheels, the cutting wheels situated at the extremities of the radial arms penetrate above the silage surface into the silage layer left sticking to the inner silo surface and cut this layer away, the silage of the latter then dropping down and being conveyed to the suction aperture of the pneumatic suction extractor pipe by the conveying toothed wheels. Above their point of penetration into the layer, the cutting wheels for the layer left adhering to the inner surface are braced against the inner silo surface by means of a spacing wheel and held at a constant distance from the silo surface, so that the layer left behind is cut away without touching the inner surface of the silo wall.

BRIEF DESCRIPTION OF THE DRAWINGS

In order that the invention may be more clearly understood, reference will now be made to the accompanying drawings which show two embodiments thereof by way of example and in which.

DETAILED DESCRIPTION OF PREFERRED EMBODIMENTS

The known devices for extracting silage from tall circular silos comprise a central part having a suction head of a pneumatic conveying pipe and rotarily driven radial arms on which are freely rotatably installed cutting wheels or toothed conveying wheels which are positioned obliquely with respect to the radius and to an axial plane of the silo. The cutting wheels carry the weight of the extractor device and thereby penetrate into the upper layer of the silage and by virtue of the oblique position feed the latter to the suction head during rotation of the conveying radial arms.

Figure 1:
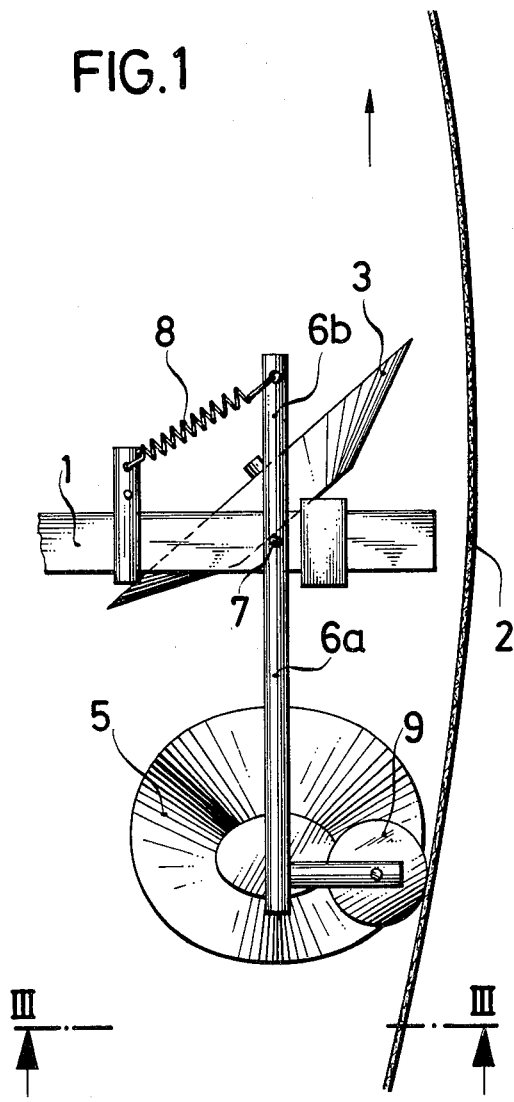
FIGS. 1 and 2 show two partial horizontal cross-sections through the peripheral wall of a tall silo, with diagrammatical plan view of the extremity of a radial arm of the extractor device and of the cutting device in accordance with the invention.
Figure 2:
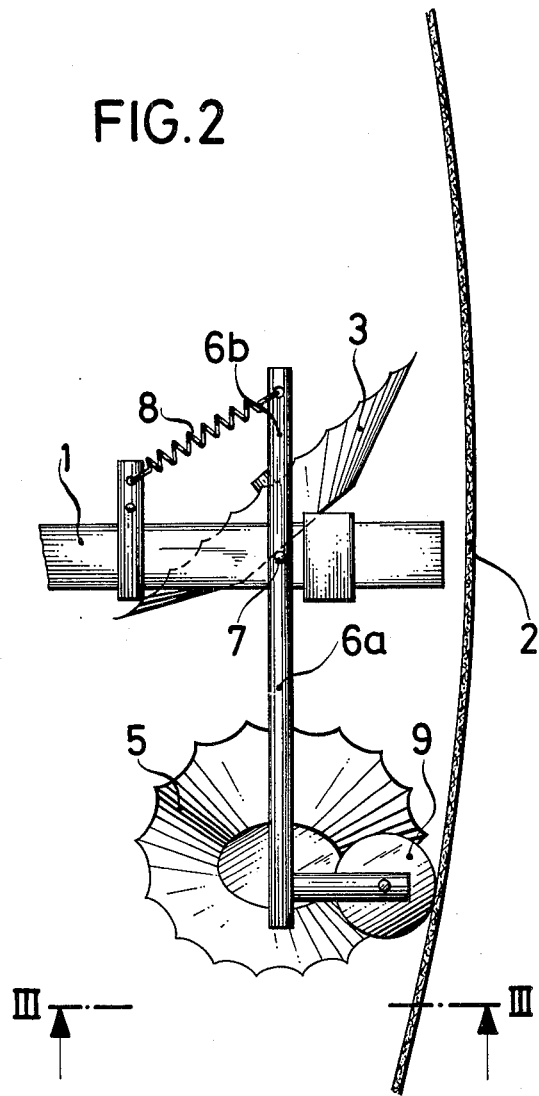
Figure 3:
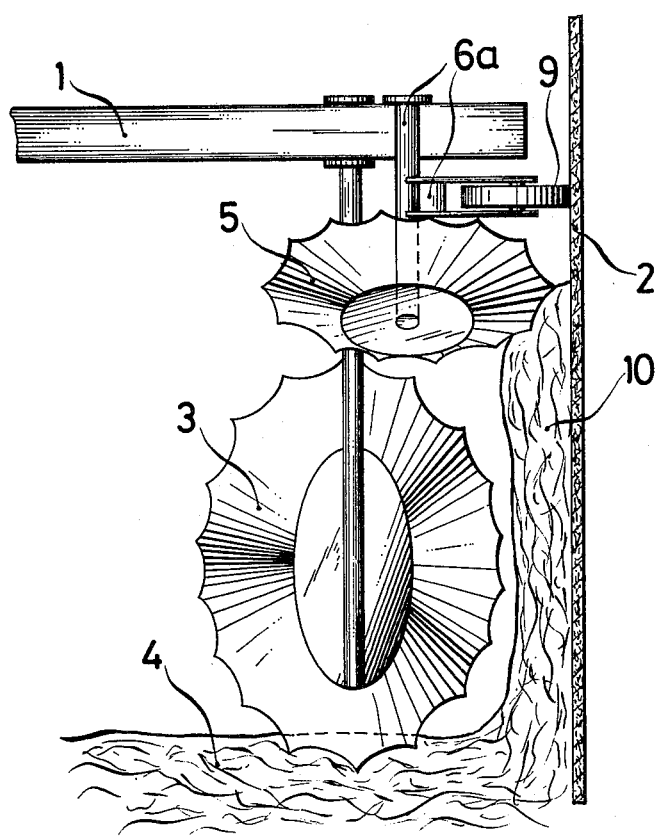
FIG. 3 shows a view as seen from the section line III—III of FIGS. 1 and 2.

Referring now to the drawings, only the outer extremity of one of a plurality of radial arms 1 of an extractor device within a circular tall silo 2 is illustrated in FIGS. 1 to 3. The arms 1 carry freely rotatable cutting wheels 3 set obliquely with respect to the radius and the axial (vertical) plane of the silo, only the outermost cutting wheel 3 being illustrated, and which engage the actual silage material and convey the same in the direction toward the center.

In accordance with the invention, a cutting wheel 5 which is set at an angle of incidence with respect to the plane of circular translation of the cutting wheel 3, or a plane parallel to the rotation plane of the arms 1, is freely rotatably journalled on each or only some of the radial arms 1 in a plane above and parallel to the silage surface. The cutting wheel 5 is carried by the one arm 6a of a double lever which is pivotally journalled on the radial arm 1 at 7 and the other arm 6b of which is acted upon by a tension spring 8 whereby the cutting wheel 5 is pulled in the direction towards the silo wall 22. Since the inner surface of the silo wall 2 is generally enamelled or otherwise finished to protect it against attack by acid, the cutting wheel 5 should not come into contact with this inner surface and therefore is always held at a small distance from the wall 2 during revolution of the radial arms. In this embodiment this is effected by means of a spacing wheel 9 which is journalled above the cutting wheel 5 on the lever link 6a and bears against the inner side of the wall 2. The spacing wheel 9 always bears directly against the inner silo surface since the sticking or frozen layer on the inner surface is cut away below this spacing wheel.

The conveying cutting wheels 3 may have a toothed periphery or may be provided with at least one radial cog at the periphery. The cutting wheel 5 may be constructed in the same manner.

During operation of the extractor device, the cutting wheels 3 are engaged in the silage by the weight of the extractor device acting on them, and by revolution of the radial arms 1 and the angle of incidence of the cutting wheels 3, they convey said silage to the suction aperture of the pneumatic conveying pipe. If the silage 4 is tacky or frozen, a silage layer 10 (FIG. 3) is left on the inner surface 2, since the outermost conveying cutting wheels 3 must be at a distance from the inner wall surface, to avert damage to the enamel or other coating.

This layer 10 is now cut away by the cutting wheels 5 at the extremities of the radial arms, their periphery being set at a small distance from the wall 2 by the supporting spacing wheel 9. By virtue of its position, the spacing wheel 9 bears direct on the inner surface of the wall, so that the cutting wheel 5 has its periphery always set at a constant distance from the wall.

Figure 4:
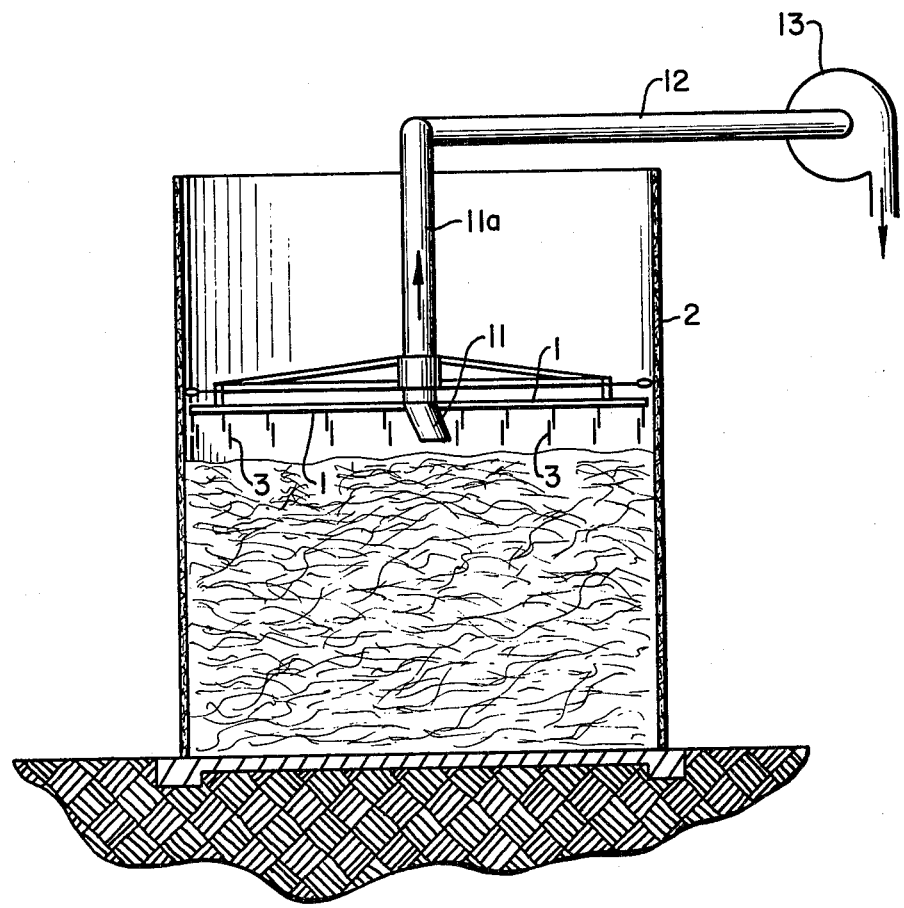
FIG. 4 shows a partial vertical cross-section through the peripheral wall of the silo of FIGS. 1 and 2, illustrating the suction head of a pneumatic conveying pipe.

A conventional suction head of a pneumatic conveying pipe is illustrated in FIG. 4. A pneumatically conveying suction pipe 12 (for extracting silage from the silo) leads to a blower 13 from which the silage may be fed to a cowshed.

Suction pipe 12 is provided with a telescopic part 11a having at the lower end or bottom thereof, a suction aperture or mouth 11.

I claim:

1. An apparatus for extracting silage for a cylindrical silo, comprising:
   suction extractor pipe means having a suction aperture,
   a plurality of supporting radial arms connected to said extractor pipe means,
   conveying wheels freely and rotatably journalled on said radial arms and directly carrying the weight of the extracting apparatus,
   said conveying wheels positioned obliquely with respect to the radius and axial plane of said silo for feeding silage material to said suction aperture,
   a cutting wheel disposed in a plane above said conveying wheels and freely and rotatably journalled on each of said radial arms at an extremity thereof next adjacent to the vertical wall of said silo, said cutting wheel being set at an angle of incidence with respect to the plane of circular translation of said conveying wheels as well as with respect to a plane parallel to the rotation plane of said radial arms, and
   a spacing wheel disposed in a horizontal plane above said cutting wheel and supported against the vertical wall of said silo,
   said cutting wheel being held at a small distance from the vertical wall of said silo, and being resiliently braced against the vertical wall of said silo by means of said spacing wheel.

2. An apparatus according to claim 1, wherein the peripheral portion of said cutting wheel is provided with means selected from a group consisting of teeth, serrations, and at least one radial cog.

3. An apparatus according to claim 1, further comprising:
   a double lever journalled on each one of said radial arms, and
   spring means pivotally connected to said double lever,
   said double lever being provided with one arm for carrying said cutting wheel and said spacing wheel, and another arm acted upon by said spring means whereby said cutting wheel is pulled in the direction towards the vertical wall of said silo.

* * * * *